United States Patent Office 3,838,129
Patented Sept. 24, 1974

3,838,129
FUNGICIDAL PIPERAZINE DERIVATIVES
Max Pianka, St. Albans, England, assignor to Murphy Chemical Limited, St. Albans, Hertfordshire, England
No Drawing. Filed Apr. 24, 1972, Ser. No. 246,665
Claims priority, application Great Britain, Apr. 28, 1971, 11,947/71
Int. Cl. C07d 51/70
U.S. Cl. 260—268 R      4 Claims

ABSTRACT OF THE DISCLOSURE

Fungicidal compounds for the control of plant pathogenic fungi or for biocidal use have the formula:

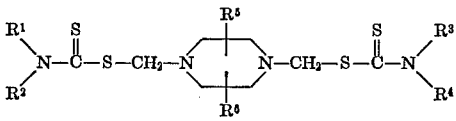

wherein $R^1$, $R^2$, $R^3$ and $R^4$ are each independently selected from lower alkyl groups and $R^5$ and $R^6$ are independently selected from hydrogen atoms and lower alkyl groups.

---

This invention is concerned with compounds having biocidal and fungicidal activity, and compositions containing them.

One aspect of this invention provides compounds of the general formula:

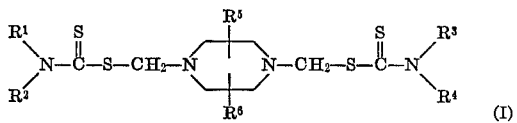 (I)

wherein $R^1$, $R^2$, $R^3$ and $R^4$ are the same or different lower alkyl groups and $R^5$ and $R^6$ are the same or different and each is a hydrogen atom or a lower alkyl group.

Preferably the groups $R^1$, $R^2$ are the same as the groups $R^3$, $R^4$. $R^1$–$R^4$ may e.g., all be methyl groups, and $R^5$, $R^6$ are preferably both hydrogen atoms.

Compounds of the general formula I may be prepared, according to another aspect of the invention, by reacting a piperazine of general formula

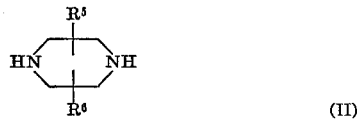 (II)

or an acid-addition salt or hydrate thereof with formaldehyde and dithiocarbamates of the general formulae

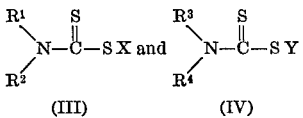

(III)         (IV)

where X and Y are the same or different cations, preferably alkali metal cations, e.g., sodium or potassium. It is normally convenient to use the same compound as compounds III and IV. When compounds III and IV are different, by-products formed by the incorporation of two residues of compound III or two residues of compound IV will of course be formed.

The reaction is preferably carried out in a liquid medium, e.g., water, and the reaction temperature may be below 40°, e.g., below 20° C. It is advantageous to use about equimolar amounts of compounds II, III and IV, and about twice the molar amount of formaldehyde. The formaldehyde is conveniently in aqueous solution.

The compounds of general formula I have utility as fungicides for the control of plant pathogenic fungi and are of particular interest as the fungicidal component of seed dressings. It is well known to dress horticultural and agricultural seeds with a fungicidal composition to protect the seed during storage and in the interval between sowing and germination. It has been found that such dressings considerably increase the proportion of seeds which germinate and reduce the number of infected plants Known seed dressings often contain organomercurial compounds. These are effective, but have an undesirably high mammalian toxicity; they may be advantageously replaced by compounds of general formula I, especially 1,4-bis(dimethyldithiocarbamoylmethyl)piperazine.

Therefore a further aspect of the invention provides a fungicidal composition for application to plants for the control of plant pathogenic fungi, e.g. in the form of a seed dressing, comprising a fungicidally effective amount of a compound of general formula I. The compound of general formula I may e.g. comprise 10–80%, preferably 25–50% by weight of a seed dressing composition.

The seed dressing composition suitably includes a solid carrier or diluent e.g. china clay or talc. A surface active agent may be included, with or without additional solid carrier or diluent when the dressing is to be applied in a moistened state. A further desirable ingredient of the composition is a pigment, e.g. iron oxide or an organic colouring material. A pigment such as iron oxide suitably comprises about 5% of the dressing, but an organic pigment may often be used in smaller amount. Such pigment enables dressed seed to be distinguished from undressed seed, and to some extent enables a check to be made on the evenness of the dressing.

The dressing may include minor proportions of other components, e.g. a "sticker" to increase adherence of the dressing to the seed. A suitable "sticker" is petroleum oil of medium viscosity, which may comprise about 2% of the composition. A further component may be added to improve the flow properties of the dressing, e.g. about 1% of magnesium stearate or about 2% of kieselguhr.

The active components should be finely ground, preferably to a particle size of less than 30 microns when they are used in solid compositions.

Solid compositions according to the invention may be used in the encapsulation of seed.

The seed dressing composition may also be used as a liquid in solution or dispersion form in a non-phytotoxic liquid medium e.g. water or a non-phytotoxic organic solvent, to enable the seed to be impregnated or coated with the active ingredients. Liquid seed dressing compositions also include aqueous compositions prepared by dissolving the compound of general formula I in water containing sufficient of at least one non-phytotoxic base to solubilise said compound. Liquid compositions of this general type are described in more detail hereinafter in relation to formulation for biocidal use, although it will be understood that seed dressings commonly employ a higher concentration of active component than biocidal compositions. Liquid seed dressing compositions may also contain colouring agents and/or stickers as described above.

Dressings according to the invention are suitable inter alia for use on wheat, barely and oats.

Suitable dosages can readily be found by experiment, but will normally be at least 0.5 g. of dressing/kg. of seed and preferably of the order of 2.0 g. of dressing/kg. of seed, e.g. up to 10 g. of dressing/kg. of seed. Significantly higher dosages give little extra advantage and may cause injury to the young seedlings.

The compound of formula I may be present in the composition according to the invention as a salt where such exists e.g. a salt formed with an organic acid. However, salts may be difficult to prepare since the compounds tend to be decomposed under acid conditions and in general the free base will be used.

Fungicidal composition according to the invention may also include additional compounds having fungicidal activity. Examples of such compounds include the guanidine derivatives disclosed in British Pat. No. 1,114,155, particularly bis-(8-guanidinooctyl)-amine and its salts; 1,8-diguanidinooctane and acid-addition salts thereof; and compounds disclosed in British Pat. No. 1,099,242, particularly 5,6 - dihydro-2-methyl-1,4-oxathiin-3-carboxanilide.

Compounds of the general formula I have exhibited activity against a wide variety of seed-borne plant pathogenic fungi, including, *Ustilago* spp., *Helminthosporium* spp., *Fusarium* spp., *Phoma betae; Venturia* spp., *Botrytis* spp., *Cercospora, Phytophthora,* barely mildew and *Colletorichum coffeanum.*

For the control of plant pathogenic fungi other than by a seed dressing composition, the compounds according to the invention can be formulated for use in any desired way. Generally such formulations will include the compound in association with a suitable carrier or diluent. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc; in such cases the carrier is a solvent or emulsion base non-phytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating mixtures wherein the compound is associated with a solid pyrotechnic component.

Compounds of general formula I are also of interest as industrial biocides, for inhibiting undesired microbial growth in systems containing water and organic compounds. The problems caused by such growth are well known. Fungi and bacteria are the principal microorganisms which grow in such systems, but algae and yeasts may also require to be controlled.

One use of biocides is to control slime formation in aqueous systems, e.g. paper mills. Slime consists of matted deposit of microorganisms, primarily formed of gelatinous substances secreted by certain species of capsulated bacteria; slimes may also be elaborated by filamentous bacteria, filamentous fungi of the mould type and certain yeasts. Apart from being undesirable from the standpoint of general cleanliness (especially in relation to food processing e.g. in dairies and breweries), slime formation results in a great increase in viscosity of the aqueous phase, reducing flow rates and tending to block filter screens and small orifices. This effect is accentuated when the system contains suspended solid which tend to be trapped by the slime. We have found that compounds of the general formula I may be effectively employed as biocides to inhibit slime formation and other undesired microbial growth.

Therefore a further feature of the present invention provides a method of inhibiting the growth and proliferation of microorganisms which comprises applying to a site infested with or susceptible to infestation by the microorganisms at least one compound of general formula I in sufficient amount to inhibit the growth and proliferation of said microorganisms.

Examples of industrial products which may be protected from microbial growth in this manner are given below; this list is not intended to be exhaustive.

(a) Water-in-oil emulsions, e.g. hydraulic fluids comprising mineral, vegetable or synthetic oils.

(b) Oil-in-water emulsions, e.g. so-called "soluble oil" used as coolant and lubricant in the engineering and metal working industries, for example in cold rolling of steel or aluminum, turning, drilling, broaching of steel workpieces and wire-drawing, etc. The soluble oil is normally recirculated continuously through a filter to trap swarf and under these conditions of good aeration and midly elevated temperature is liable to bacterial and fungal attack. Apart from slime formation, serious degradation of the oil may occur and furthermore fungi and bacteria which are pathogenic to man, e.g. *Pseudomonas pyocyanea,* may proliferate and infect operatives coming in contact with the soluble oil. The compounds of this invention are highly effective against bacteria and fungi likely to occur in soluble oil, including *P. pyocyanea.* Their activity is maintained at least for several weeks under typical conditions of use.

(c) Aqueous emulsions of elastomers and plastomers, e.g. emulsion paints, paint dispersions for electrophoretic deposition as used for example in the motor industry, and coating or binding compisitions employed for example in the paper industry. Such emulsions are prone to attack by moulds and bacteria, causing undesired changes in viscosity and appearance.

(d) Glues, sizes and adhesive of synthetic, vegetable or animal origin. Such materials often provide excellent culture media for the growth of fungi and bacteria.

(e) Paper furnishes and other aqueous systems used in paper mills. These materials have a pronounced tendency to become infested with slime-forming microorganisms. Slime reduces the strength of the paper, causing breakages of the web, and produces unsightly spots, holes and discolouration. The pH of the furnish is generally in the range 4–8 and the compounds of the invention are particularly effective to control slime over the upper part of this range of pH, especially above pH 6; they are decomposed under strongly acid conditions. This property simplifies effluent control, since acidification of the effluent decomposes the biocide.

(f) Cellulose (e.g. wood pulp, wood chips and finished paper). These materials have a much lower water content than paper furnishes, but are likewise prone to fungal and bacterial attack. They may be effectively protected by a suitable concentration of a compound according to this invention.

(g) Water. Industrial water (often not of high purity and containing appreciable amounts of organic material) may be protected from slime-forming and other microorganisms by the compounds of this invention.

(h) Drilling muds, employed to cool and lubricate rock drills. Such muds contain organic suspending agents which may suffer microbial degradation to corrosive products.

(i) Starchy and proteinaceous materials of vegetable or animal origin. These include animal hides, vegetable tanning liquors and leather.

Formulation of the compounds of the invention for biocidal use may be as described above in relation to plant fungicidal use for purposes other than seed dressing. However, the compounds do not in general have a high water solubility and so concentrated aqueous solutions, which are often preferred for biocidal use, cannot be prepared directly. We have found according to a further feature of this invention, that a concentrate suitable for biocidal use may be prepared by dissolving at least one compound of general formula I in water containing sufficient of at least one base to solubilise said compound. Preferably the concentrate contains at least 0.5%, advantageously at least 10% by weight of the compound of general formula I.

The base employed should be selected to provide effective solubilisation without raising the pH so high that the compound I is decomposed to biocidally inactive products. Either organic or inorganic bases may be used to raise the pH of the concentrate sufficiently to solubilise the compound I e.g. to above pH 10. Organic bases which may be used include water-soluble primary, secondary tertiary amines, e.g. lower alkylamines such as ethylamine; lower alkylenediamines such as ethylenediamine; heterocyclic bases such as morpholine or piperazine; lower alkanolamines, dialkanolamines and trialkanolamines, notably ethanolamine; and quaternary ammonium bases. Inorganic bases include ammonia and alkali metal hydroxides, notably sodium and potassium hydroxides. Typical compositions contain 0.5–30% of the compound I and 1–50% of organic base e.g. ethanolamine, the balance being mainly water. 1,4-bis(dimethyldithiocarbamoylmethyl)-piperazine is the preferred compound I for biocidal use.

The concentration of compounds I which is biocidally effective in practice depends on many factors and will normally be ascertained by preliminary experiment. Although, for example, 1,4-bis(dimethyldithiocarbamoylmethyl)piperazine inhibits the growth of certain bacteria in vitro such as Micrococcus sp. at a concentration as low as 1 p.p.m., it is preferred to employ a concentration of at least 100 p.p.m., preferably at least 250 p.p.m., to ensure effective control of less susceptible species.

A level of 250 p.p.m. of 1,4-bis(dimethyldithiocarbamoylmethyl)piperazine has given effective control of Microccus sp., B. alcaligenes, Aeromonas sp., Bacillus sp., Corynebacterium, Achromobacter cycloclastes, Pseudomonas sp., Alcaligenes viscolactis, E. coli, E. intermedia and organisms of the Providence group.

Examples of industrially objectionable fungi which may be controlled include Penicillium sp., Aspergillus sp., Chaetomium globosum and Cladosporium herbarum.

In order that the invention may be better understood, the following examples are given by way of illustration only; all percentages are by weight unless otherwise stated and temperatures are in ° C.

EXAMPLE 1

Preparation of 1,4-bis(dimethylthiocarbamoylmethyl) piperazine

Carbon disulphide (600 ml., 10 moles) was added dropwise to a stirred 27.5% w./v. aqueous solution of dimethylamine (1950 ml., 10 moles+20% excess) at a temperature kept between 0–10° C. with an ice/water bath. The solution was stirred for 30 minutes and then over one hour sodium hydroxide (400 g. 10 moles) in water (2000 ml.) was added, the temperature being kept between 10–15° C. The mixture was stirred for a further hour and then excess carbon disulphide and dimethylamine were removed by distillation under reduced pressure on a steam bath for 30 minutes to yield a solution of sodium dimethyldithiocarbamate.

After cooling, a 38% w./v. aqueous solution of formaldehyde (806 ml., 10 moles) was added to the stirred solution of sodium dimethyldithiocarbamate. To this mixture a solution of piperazine hydrate (970 g., 5 moles) and concentrated hydrochloric acid (860 ml.) in water (3000 ml.) was added dropwise, keeping the temperature below 20° C. by means of an ice/water bath. During the addition, water (8000 ml.) was added to facilitate stirring. The suspension was stirred for 2 hours and the solid was filtered off, washed well with water, and dried for 4 days. Final drying took place in an oven at 50° C. overnight.

The title compound was a colourless solid, m.p. 163–164° (decomp.) and the yield (1559 g.) was 88.6%. (Found: N, 15.8%, $C_{12}H_{24}N_4S_4$ requires N, 15.9%.)

EXAMPLE 2

Preparation of 1-(dimethyldithiocarbamoylmethyl)-4-(diethyldithiocarbamoylmethyl) piperazine A solution of piperazine hydrate (19.4 g., 0.1 mole) and concentrated hydrochloric acid (17 ml., 0.2 mole) in water (75 ml.) was added to a vigorously stirred aqueous solution of sodium dimethyldithiocarbamate (18.8 g., 0.1 mole), sodium diethylthiocarbamate (0.1 mole) and 37.5% w./v. aqueous formaldehyde (16 ml., 0.2 mole) and made up to 300 ml. with water, during 12 minutes. The mixture was stirred for two hours and the solid that precipitated was filtered off, washed well with water and air dried to yield the title compound, m.p. 132–138° C., weighing 33.3 g., (87%).

This compound is active against Fusarium culmorum, Fusarium graminearum, Fusarium nivale and Phoma betae.

EXAMPLE 3

Fundicidal activity

The fungicidal activity of 1,4 - bis(dimethyldithiocarbamoylmethyl) piperazine was assessed by a slide germination test. The following table shows the minimum effective concentration (in p.p.m.) of toxicant to prevent germination of 95% of spores:

TABLE 1

Fungus:
| | |
|---|---|
| Venturia inaequalis | 40 |
| Botrytis cinerea | 20 |
| Fusarium bulbigenum | 30 |
| Cearcospora melonis | 60 |

EXAMPLE 4

Preparation of seed dressings 1,4 - bis(Dimethyldithiocarbamoylmethyl) piperazine (40 g.) was mixed with finely divided china clay (60 g.) and the mixture was finely ground in a hammer mill to form a seed dressing.

EXAMPLE 5

Fungicidal activity: oats

Dressings containing 1,4-bis(dimethyldithiocarbamoylmethyl) piperazine (the compound of example 1) and dressings containing control compounds were tested for activity against the seed-borne fungus Helminthosphorium avenae (mercury resistant) on forward oats, under growth room conditions.

The experimental materials were formulated as a slurry with an inert carrier substance and the minimum quantity of a suitable wetting agent. This slurry was applied to forward oats known to contain a high proportion of natural fungal infection. The rate of application was about 1.25 g./kg. of seed.

The seed dressing tested contained 50% of 1,4-bis(dimethyldithiocarbamoylmethyl) piperazine, and as a standard for comparison, an organomercurial treatment containing the equivalent of 1% of mercury was included, together with some untreated seed to give a measure of the infection rate.

The prepared seeds were sown in calcined china clay contained in small plastic trays and were germinated under carefully controlled conditions of water, light and temperature.

About three weeks after sowing, when the seedlings were 7.5–10 cm. high, they were removed from the trays and were assessed for disease symptoms. Seedlings which were badly infected failed to emerge about the surface of the clay, and these were assessed as showing "pre-emergence blight." Seedlings which emerged but showed brown streaks on the lower part of the stem were classified as "emerged but diseased," while unaffected seedlings were counted as "emerged and healthy."

Three series of tests were performed, with the results shown in Table 2 below:

TABLE 2

| Treatment | Percent | | | |
|---|---|---|---|---|
| | Total emerged plants | Pre-emergence blight | Emerged diseased | Emerged healthy |
| Series 1: | | | | |
| Compound of example 1 (50%) | 96 | 1 | 10 | 85 |
| Organomercurial | 95 | 4 | 44 | 47 |
| Untreated | 96 | 1 | 56 | 39 |
| Series 2: | | | | |
| Compound of example 1 (50%) | 96 | 2 | 36 | 58 |
| Organomercurial | 90 | 4 | 73 | 13 |
| Untreated | 91 | 4 | 76 | 11 |
| Series 3: | | | | |
| Compound of example 1 (50%) | 83 | 8 | 9 | 66 |
| Organomercurial | 86 | 5 | 47 | 34 |
| Untreated | 90 | 4 | 45 | 41 |

EXAMPLE 6

Fungicidal activity: wheat

The procedure of Example 5 was repeated except that the fungus was *Fusarium nivale* and the host plant was Atle wheat. Only one series of tests were performed, with the results shown in Table 3.

TABLE 3

| Treatment | Percent | | | |
|---|---|---|---|---|
| | Total emerged plants | Pre-emergence blight | Emerged diseased | Emerged healthy |
| Compound of example 1 (50%) | 90 | 3 | 28 | 59 |
| Organomercurial | 89 | 1 | 29 | 59 |
| Untreated | 89 | 5 | 41 | 43 |

EXAMPLE 7

Fungicidal activity

The compound of Example 1 was tested under growth room conditions for activity against *Venturia inaequalis* (apple scab), *Uromyces fabae* (broad bean rust), *Botrytis fabae* (chocolate spot of beans) and *Cladosporium fulvum* (tomato leaf mould).

The methods of testing are as follows:

(1) Apple scab (*Venturia inaequalis*): Apple rootstocks are grown in peat; they are selected for test when the shoots are about 6" high. Four replicates per treatment are used.

The test compounds are formulated as 25% micronised wettable powders containing a cellulose derivative sticker; captan is used as a standard comparison material. Untreated plants are included in each test.

The treatments are applied at 62.5 and 500 p.p.m. and are sprayed on to the upper surfaces of the leaves to run-off and allowed to dry.

The treated rootstocks are placed inside humidity chambers and inoculated with a suspension of *Venturia* spores in water containing 4–500,000 spores per ml., by spraying the suspension onto the upper leaves of the rootstocks.

The rootstocks are transferred to the greenhouse after infection has taken place. Disease symptoms show up after 18–21 days and an assessment is made of percent infection on the five topmost leaves.

A grading system is used for the assessment:

| Grade: | Percent infection |
|---|---|
| 0 | 0 |
| 1 | 0–2 |
| 2 | 3–7 |
| 3 | 8–17 |
| 4 | 18–41 |
| 5 | 42–100 |

The means of grade/leaf per treatment is calculated and then converted to a mean scab index representing actual percent infection.

The percent protection is calculated for each treatment by reference to the untreated scab index.

(2) Broad bean rust (*Uromyces fabae*): Bean plants growing in a peat/sand mixture are used for test when they have 3–4 pairs of fully expanded leaflets. Four replicate plants are used per treatment.

The test compounds are used as wettable powders and are compared with the standard zineb. Untreated plants are included in each test.

The treatments are sprayed on both leaf surfaces until run-off occurs.

After the plants have dried they are placed in humidity chambers and inoculated by dry spores. After 24 hours the plants are transferred to the greenhouse.

Symptoms show up after 7–8 days and an assessment is made on a 0–9 scale as follows:

| Grade: | Lesions/leaflet |
|---|---|
| 0 | 0 |
| 1 | 1 |
| 2 | 3 |
| 3 | 7 |
| 4 | 15 |
| 5 | 31 |
| 6 | 63 |
| 7 | 127 |
| 8 | 255 |
| 9 | 361+ |

24–32 leaflets per treatment are assessed. The mean grade/leaf for each treatment is calculated and the indices and percent protection derived as above.

(3) Chocolate spot of beans (*Botrytis fabae*): Broad bean plants are selected with 3–4 fully expanded pairs of leaflets; two plants per treatment are used.

The test compound (wettable powder) and thiram (standard) are applied to both leaf surfaces by spraying.

Discs are cut from the leaves of the treated plants (2 per leaflet) with a cork borer and placed adaxial surface down in groups of four at four positions at right angles on moist filter paper supported by a glass plate in 13 cm. petri dishes; 16 discs per treatment are cut, and these are randomised (in groups of four) between the different dishes.

The discs are inoculated by spraying the dishes with a *Botrytis* spore suspension in nutrient solution adjusted to 130–150,000 spores/ml.

Disease symptoms show up after 24 hours, and the number of lesions per disc are assessed on a scale similar to that used for bean rust.

The percent control is calculated as above with reference to untreated indices.

(4) Tomato leaf mould (*Cladosporium fulvum*): Tomato plants with 5–6 compound leaves showing are selected for test, four per treatment.

Test materials are formulated as wettable powders; zineb is used as the standard material. Plants are sprayed to run-off (both leaf surfaces), left to dry and then placed in humidity chambers together with untreated controls.

The test plants are inoculated by spraying them with a suspension of *Cladosporium* spores in water adjusted to 1–200,000 spores/ml. After 24 hours, the plants are transferred to the greenhouse.

Disease symptoms show up after 21 days; infection is assessed on 4–5 compound leaves/plant as in the apple scab test.

Mean grades and indices are calculated and percent protection derived as above.

For all tests:

$$\text{Percent protection} = \frac{(X-Y)}{X} \cdot 100$$

where $X$=untreated index; $Y$=treated index.

The results are shown in Table 4 blow.

TABLE 4

| Fungus | Concentration of active ingredient in p.p.m. | Percent control | |
|---|---|---|---|
| | | Compound of Example 1 | Standard |
| Venturia inaequalis | 62.5 | 97.0 | 89.5 (captan). |
| Venturia inaequalis | 500 | 99.5 | |
| Uromyces fabae | 125 | 93.5 | 93.5 (zineb). |
| Uromyces fabae | 500 | 99.5 | |
| Botrytis fabae | 250 | 85.0 | 84.5 (thiram). |
| Botrytis fabae | 500 | 97.5 | 99 (thiram). |
| Cladosporium fulvum | 500 | 66 | 66 (zineb). |

EXAMPLE 8

Biocidal concentrate

The compound of Example 1 (200 g.) was dissolved in a mixture of ethanolamine (300 g.) and water (500 g.). The solution remained clear at room temperature.

EXAMPLE 9

Biocidal use in soluble oil

Soluble oil (mineral oil emulsified in water) was inoculated with 13 species of microorganisms obtained from infected oil, including the human pathogen *Pseudomonas pyocyanea*. The soluble oil was then employed as a coolant in a mechanical hacksaw under operational conditions.

The initial concentration of viable microorganisms/ml. of coolant was $1.55 \times 10^8$. At the commencement of the test sufficient of the composition of Example 8 was added to give a concentration of 1,4-bis(dimethyldithiocarbamoylmethyl) piperazine of 500 p.p.m. Samples of coolant taken at increasing intervals after the addition of biocide showed the following concentrations of viable microorganisms:

| Time after addition of biocide: | Viable microorganisms/ml. |
|---|---|
| 2 days | 450 |
| 4 days | <10 |
| 7 days | <10 |

EXAMPLE 10

Biocidal protection of paint

Four samples of water-based paint, comprising an aqueous emulsion of synthetic plastomers and elastomers, were inoculated with a mixed culture of microorganisms obtained from infected paint. The concentration of viable microorganisms was $4.45 \times 10^3$/ml.

The biocidal composition of Example 8 was then added to give a concentration of 1,4-bis(dimethyldithiocarbamoylmethyl)piperazine of 750 p.p.m.

The number of viable microorganisms/ml. was measured each day for 10 days and remained below 10 in all four samples. In an untreated control the concentration was above $10^6$ microorganisms/ml. after one day.

EXAMPLE 11

Biocidal protection of a paper furnish

A sample of paper furnish (i.e. a slurry of wood fibres and other paper-making components, pH 7.5) was incubated for 6 hours at room temperature. It had a high level of bacterial infection, amounting to $3 \times 10^7$ viable organisms/ml. After incubating for a further 15 hours the concentration of viable microorganisms was $3.2 \times 10^7$/ml.

1,4 - bis(dimethyldithiocarbamoylmethyl)piperazine, dissolved in water/acetone (1:1) was added to the furnish to a concentration of 400 p.p.m. and the furnish was mixed on an orbital shaker (200 r.p.m.). Samples of furnish taken at intervals revealed the following levels of viable microorganisms:

| Time after addition of biocide (hours): | Infection level (viable microorganisms/ml.) |
|---|---|
| 0 | $3.2 \times 10^7$ |
| 2 | $8.4 \times 10^5$ |
| 5 | $7.0 \times 10^4$ |
| 24 | 0 |
| 48 | 0 |

EXAMPLE 12

Biocidal concentrate

A 15% w./v. solution of the compound of Example 1 was prepared in aqueous sodium hydroxide. The pH of the concentrate was 10.5.

EXAMPLE 13

The composition of Example 12 was used to protect soluble oil (inoculated with microorganisms as in Example 9) during use as a coolant or an operational lathe. The initial concentration of viable microorganisms/ml. of coolant was $9 \times 10^6$. Sufficient of the composition of Example 12 was added to give a concentration of 1,4-bis (dimethyldithiocarbamoylmethyl)piperazine of 500 p.p.m. On the 8th day after the addition of the biocide an equal volume of soluble oil and water was added, thereby reducing the concentration of biocide to 250 p.p.m.

Samples of coolant taken at increasing intervals after the addition of biocide showed the following concentrations of viable microorganisms:

| Time after addition of biocide: | Viable microorganisms/ml. |
|---|---|
| 1 day | 90 |
| 5 days | <10 |
| 11 days | <10 |

We claim:

1. A compound of the formula

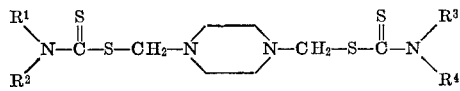

where $R^1$, $R^2$, $R^3$, and $R^4$ are each methyl or ethyl.

2. A compound as claimed in claim 1 wherein the groups $R^1$ and $R^2$ are the same as the groups $R^3$ and $R^4$.

3. The compound of claim 1 which is 1,4-bis(dimethyldithiocarbamoylmethyl)piperazine.

4. The compound of claim 1 which is 1-(dimethyldithiocarbamoylmethyl) - 4 - (diethyldithiocarbamoylmethyl)piperazine.

References Cited

UNITED STATES PATENTS

| | | | |
|---|---|---|---|
| 2,585,826 | 2/1952 | Olsen | 260—268 R |
| 2,844,580 | 7/1958 | Ashby et al. | 260—268 R |
| 3,131,213 | 4/1964 | Surrey et al. | 260—268 R |
| 3,185,693 | 5/1965 | Dunbar | 260—268 R |
| 3,228,949 | 1/1966 | Risse | 260—268 R |
| 3,539,612 | 10/1970 | Tioeit | 260—268 R |
| 2,547,722 | 4/1951 | Stewart | 260—283 S |
| 3,131,213 | 4/1964 | Surrey | 260—268 R |
| 3,547,638 | 12/1970 | Cassar et al. | 260—268 R |
| 3,721,674 | 3/1973 | Abbate et al. | 260—268 R |

DONALD G. DAUS, Primary Examiner

U.S. Cl. X.R.

8—94.1 R; 106—15 R; 252—8.5 R, 106; 424—250